United States Patent
Xi et al.

(10) Patent No.: US 12,254,592 B2
(45) Date of Patent: Mar. 18, 2025

(54) DIRECT STRUCTURED ILLUMINATION MICROSCOPY RECONSTRUCTION METHOD

(71) Applicant: Peking University, Beijing (CN)

(72) Inventors: Peng Xi, Beijing (CN); Shan Jiang, Beijing (CN); Hui Qiao, Beijing (CN); Qionghai Dai, Beijing (CN)

(73) Assignee: Peking University, Beijing (CN)

(*) Notice: Subject to any disclaimer, the term of this patent is extended or adjusted under 35 U.S.C. 154(b) by 324 days.

(21) Appl. No.: 17/998,484

(22) PCT Filed: Aug. 20, 2020

(86) PCT No.: PCT/CN2020/110154
§ 371 (c)(1),
(2) Date: Nov. 10, 2022

(87) PCT Pub. No.: WO2021/227292
PCT Pub. Date: Nov. 18, 2021

(65) Prior Publication Data
US 2023/0214961 A1    Jul. 6, 2023

(30) Foreign Application Priority Data
May 12, 2020 (CN) .......................... 202010396335.5

(51) Int. Cl.
*G06T 3/00* (2024.01)
*G01N 21/64* (2006.01)
(Continued)

(52) U.S. Cl.
CPC ....... *G06T 3/4053* (2013.01); *G01N 21/6458* (2013.01); *G01N 21/6486* (2013.01);
(Continued)

(58) Field of Classification Search
CPC ... G06T 3/4053; G06T 3/4007; G06T 3/4084; G06T 5/70; G06T 7/521;
(Continued)

(56) References Cited

U.S. PATENT DOCUMENTS

| 9,823,127 | B2* | 11/2017 | Wax | G01B 9/02091 |
| 10,799,111 | B2* | 10/2020 | Schmoll | A61B 3/152 |
| 2019/0162945 | A1* | 5/2019 | Hua | H04N 23/56 |

FOREIGN PATENT DOCUMENTS

CN    107180411 A * 9/2017 ........... G06T 3/4053

OTHER PUBLICATIONS

Zhou, Xing et al. "Image recombination transform algorithm for superresolution structured illumination microscopy." Journal of biomedical optics vol. 21,9 (2016): 96009. doi:10.1117/1.JBO.21.9.096009 (Year: 2016).*

(Continued)

*Primary Examiner* — Bobbak Safaipour
*Assistant Examiner* — Dylan Joseph Sherrillo
(74) *Attorney, Agent, or Firm* — Berkeley Law & Technology Group, LLP

(57) ABSTRACT

A direct structured illumination microscopy (dSIM) reconstruction method is provided. First, a time domain modulation signal is extracted through a wavelet. Then, an incoherent signal is converted into a coherent signal. Next, an accumulation amount at each pixel is calculated. Finally, a super-resolution image is generated by using a correlation between signals at different spatial positions. An autocorrelation algorithm of dSIM is insensitive to an error of a reconstruction parameter. dSIM bypasses a complex frequency domain operation in structured illumination microscopy (SIM) image reconstruction, and prevents an artifact caused by the parameter error in the frequency domain operation. The dSIM algorithm has high adaptability and can (Continued)

be used in laboratory SIM, nonlinear SIM imaging systems, or commercial systems.

8 Claims, 13 Drawing Sheets

(51) Int. Cl.
  G06T 3/4007 (2024.01)
  G06T 3/4053 (2024.01)
  G06T 3/4084 (2024.01)
  G06T 5/70 (2024.01)
  G06T 7/521 (2017.01)
(52) U.S. Cl.
  CPC .......... *G06T 3/4007* (2013.01); *G06T 3/4084* (2013.01); *G06T 5/70* (2024.01); *G06T 7/521* (2017.01); *G06T 2207/10056* (2013.01); *G06T 2207/10064* (2013.01)
(58) Field of Classification Search
  CPC . G06T 2207/10056; G06T 2207/10064; G06T 2207/10148; G06T 2207/20221; G06T 5/50; G01N 21/6458; G01N 21/6486; G01N 21/6408; G01N 21/645; G01N 2021/6467; G02B 21/16; G02B 21/367
  USPC .......... 382/279, 280, 281, 248, 250
  See application file for complete search history.

(56) References Cited

OTHER PUBLICATIONS

Y. Zhang, C. Luo, H. Wang, S. Lang, Y. Gong and Y. Tang, "Initial Phase and Modulation Factor Optimization for Structured Illumination Microscopy," in IEEE Photonics Journal, vol. 9, No. 5, pp. 1-9, Oct. 2017, Art No. 6900609, doi: 10.1109/JPHOT.2017.2743223. (Year: 2017).*

M. H. Conde, B. Zhang, K. Kagawa and O. Loffeld, "Low-Light Image Enhancement for Multiaperture and Multitap Systems," in IEEE Photonics Journal, vol. 8, No. 2, pp. 1-25, Apr. 2016, Art No. 6900325, doi: 10.1109/JPHOT.2016.2528122. (Year: 2016).*

Perez, Victor et al. "Optimal 2D-SIM reconstruction by two filtering steps with Richardson-Lucy deconvolution." Scientific reports vol. 6 37149. Nov. 16, 2016, doi:10.1038/srep37149 (Year: 2016).*

* cited by examiner

DIRECT STRUCTURED ILLUMINATION MICROSCOPY RECONSTRUCTION METHOD

CROSS REFERENCE TO RELATED APPLICATION

This patent application claims the benefit and priority of PCT/CN2020/110154 filed Aug. 20, 2020 which claims priority to Chinese Patent Application No. 202010396335.5, filed with the China National Intellectual Property Administration on May 12, 2020, the disclosure of which are both incorporated by reference herein in its entirety as part of the present application.

TECHNICAL FIELD

The present disclosure relates to fluorescence microscopic imaging technologies, and specifically, to a direct structured illumination microscopy (dSIM) reconstruction method.

BACKGROUND

In comparison with conventional microscopy, a spatial resolution can reach 10 to 100 nm and ultrastructures of molecular sites and nerve cells can be observed through super-resolution microscopy. There are three mainstream super-resolution technologies. Stimulated emission depletion microscopy (STED) has an excessively high depletion illumination intensity and a low spot scanning temporal resolution. Single molecule localization microscopy (SMLM) requires thousands of original images to be acquired, and has a low temporal resolution and a high illumination intensity. Therefore, these two technologies are not suitable for imaging of living cells. Structured illumination microscopy (SIM) has a lowest illumination intensity, fast imaging speed, and multicolor imaging capability, and is suitable for fast imaging of living cells.

A conventional SIM method moves high-frequency information to a correct position in a frequency domain through spatial frequency separation, and then returns to a spatial domain to generate a super-resolution image. A SIM reconstruction effect heavily relies on an algorithm, and parameters such as a fringe direction, phase, and modulation depth in an experiment are extremely sensitive to errors. SIM is prone to artifacts, which affect quality of the super-resolution image. In reality, actual parameters in an entire field of view are non-uniform, and differences between uniformly specified reconstruction parameters and actual local parameters lead to artifacts in a SIM reconstructed image. The artifacts hinder an analysis result of the super-resolution image.

SUMMARY

In view of the foregoing problems in the prior art, the present disclosure provides a dSIM reconstruction algorithm, which is different from conventional SIM and image scanning microscopy (ISM) (AiryScan or SD-SIM).

Based on SIM, the present disclosure provides a brand-new reconstruction method, which is a super-resolution microscopy method that can double a resolution and prevent artifacts, and is named dSIM.

Structured light is illumination light with periodic stripes. A process of illuminating a sample at different phases is a process of modulating the sample. There are different modulation directions and different phases in each modulation direction. Structured illumination can make high-frequency information of the sample generate frequency shifts and enter an observable optical transfer function (OTF), and make the high-frequency information be moved to a correct position in a frequency domain through a method, to enlarge the OTF of an optical system and achieve a super-resolution microscopic effect. An original image obtained by a structured illumination microscope is a three-dimensional (3D) original image, a two-dimensional (2D) original image, or a total internal reflection fluorescence (TIRF) SIM image.

In a dSIM reconstruction method in the present disclosure, an original image is a 3D original image. The method includes the following steps:

(1) obtaining an original image stack, where
illumination of a sample by structured light has N modulation directions, each modulation direction has M phases, N and M are natural numbers greater than or equal to 2, and one original image is acquired at each phase in each modulation direction such that N×M 3D original images are obtained to form the original image stack;

(2) preprocessing the original image stack, which specifically includes:
  (a) for each 3D original image in the original image stack, extracting a first modulation frequency K1, a second modulation frequency K2, and a zero frequency K0 of each pixel by using a wavelet packet frequency separation method;
  (b) for each 3D original image, generating a first extracted image by combining the first modulation frequency K1 with the zero frequency K0 to obtain a first extracted image stack, and generating a second extracted image by combining the second modulation frequency K2 with the zero frequency K0 to obtain a second extracted image stack, where two extracted images are generated from one 3D original image, an extracted image stack including the first extracted image stack and the second extracted image is formed, and a number of images in the extracted image stack is doubled, namely, 2N×M;
  (c) performing interpolation on each image in the first extracted image stack and the second extracted image stack through spatial frequency domain fast Fourier transform (FFT) zero padding to increase a sampling frequency to more than twice and obtain first and second interpolated extracted image stacks;
  (d) denoising extracted images in the first and second interpolated extracted image stacks to obtain first and second denoised extracted image stacks; and
  (e) performing deconvolution on each denoised extracted image in the first and second denoised extracted image stacks through a Richardson-Lucy (RL) algorithm to improve a relative strength of a high-frequency signal and obtain first and second preprocessed extracted image stacks to form a preprocessed image stack with 2N×M images;

(3) extracting the first modulation frequency K1 and the second modulation frequency K2 from the preprocessed image stack, which specifically includes:
  (a) extracting the first modulation frequency K1 from a timing signal in each pixel of each image in the first preprocessed image stack and extracting the second modulation frequency K2 from a timing signal in each pixel of each image in the second preprocessed image stack by using a wavelet packet filter;
  (b) extracting, by using a low-pass filter, complex modulation signals from time evolution of the first modulation frequency K1 and the second modulation frequency K2 extracted from each pixel, to convert an incoherent real signal of the 3D original image into a coherent complex modulation signal; and (c) performing FFT interpolation on the extracted complex modulation signals to increase the sampling frequency to more than twice and obtain a complex modulation image stack;

(4) performing autocorrelation calculation on each pixel, which specifically includes:

calculating an autocorrelation accumulation amount of the complex modulation signal at each pixel of the extracted complex modulation image stack, generating one autocorrelation image for M phases of the first modulation frequency K1 in each modulation direction to obtain N autocorrelation images, and generating one autocorrelation image for the second modulation frequency K2 in each modulation direction to obtain N autocorrelation images, to generate super-resolution images by using autocorrelation accumulation amounts of signals at different spatial positions, where 2N images are generated from each original image stack;

(5) post-processing the autocorrelation images, which specifically includes:

performing RL deconvolution on the autocorrelation images; and calculating a square root of each pixel value in deconvoluted autocorrelation images to obtain dSIM intermediate processing results, where calculating the square root can improve linearity of the result, but reduces the resolution of a dSIM image; and (6) performing dSIM image fusion, which specifically includes:

adding the dSIM intermediate processing results at the first modulation frequency and the second modulation frequency in different modulation directions to generate a final dSIM image.

The denoising in substep (d) of step (2) includes: performing Butterworth low-pass filtering on spatial and frequency domain images.

Extracting the complex modulation signals from the time evolution of the first modulation frequency K1 and the second modulation frequency K2 in substep (b) of step (3) includes: extracting a real signal of the modulation frequency by using a wavelet packet, and extracting the complex modulation signal by using the filter.

Calculating the autocorrelation accumulation amount at each pixel and generating the autocorrelation image for the M phases of each of the first modulation frequency and the second modulation frequency in step (4) includes: calculating the autocorrelation accumulation amount of the complex modulation signal at each pixel in the complex modulation image stack of the M phases in the same modulation direction, and generating a result image to obtain the autocorrelation image.

In a dSIM reconstruction method in the present disclosure, an original image is a 2D original image or a TIRF microscopy image. The method includes the following steps:

(1) obtaining an original image stack, where illumination of a sample by structured light has N modulation directions, each modulation direction has M phases, N and M are natural numbers greater than or equal to 2, and one original image is acquired at each phase in each modulation direction such that N×M 2D original images or TIRF microscopy images are obtained to form the original image stack;

(2) preprocessing the original image stack, which specifically includes:

(a) performing interpolation on each 2D original image or TIRF microscopy image in the original image stack through spatial frequency domain FFT zero padding to increase a sampling frequency to more than twice and obtain an interpolated extracted image stack;

(b) denoising extracted images in the interpolated extracted image stack to obtain a denoised extracted image stack; and (c) performing deconvolution on each denoised extracted image in the denoised extracted image stack through an RL algorithm to improve a relative strength of a high-frequency signal and obtain N×M preprocessed images to form a preprocessed image stack;

(3) extracting a modulation frequency K from the preprocessed image stack, which specifically includes:

(a) extracting the modulation frequency K from a timing signal in each pixel of each image in the preprocessed image stack by using a wavelet packet filter;

(b) extracting, by using a low-pass filter, complex modulation signals from time evolution of the modulation frequency K extracted from each pixel, to convert an incoherent real signal of the 2D original image or the TIRF microscopy image into a coherent complex modulation signal; and (c) performing FFT interpolation on a complex amplitude signal in the extracted complex modulation signal to increase the sampling frequency to more than twice and obtain a complex modulation image stack;

(4) performing autocorrelation calculation on each pixel, which specifically includes:

for the complex modulation signals extracted from the complex modulation image stack, calculating an autocorrelation accumulation amount at each pixel, and generating one autocorrelation image for the M phases in each modulation direction to obtain N autocorrelation images, where the autocorrelation images are super-resolution images, to generate super-resolution images by using autocorrelation accumulation amounts of signals at different spatial positions;

(5) post-processing the autocorrelation images, which specifically includes:

performing RL deconvolution on the autocorrelation images, and calculating a square root of each pixel value in deconvoluted autocorrelation images to obtain dSIM intermediate processing results, where calculating the square root can improve linearity of the result, but reduces the resolution of a dSIM image.

(6) performing dSIM image fusion, which specifically includes:

adding the dSIM intermediate processing results in different modulation directions to generate a final dSIM image.

The denoising in substep (d) of step (2) includes: performing Butterworth low-pass filtering on spatial and frequency domain images.

Extracting the complex modulation signals from the time evolution of the modulation frequency K extracted from each pixel in substep (b) of step (3) includes: extracting a real signal of the modulation frequency by using a wavelet packet, and extracting the complex modulation signal by using the filter.

Calculating the autocorrelation accumulation amount at each pixel and generating the autocorrelation image for the M phases in each modulation direction in step (4) includes: calculating the autocorrelation accumulation amount of the complex modulation signal at each pixel in the complex modulation image stack of the M phases in the same modulation direction, and generating a result image to obtain the autocorrelation image.

The present disclosure has the following advantages:

Different from conventional SIM and ISM (AiryScan or SD-SIM), the dSIM reconstruction algorithm in the present disclosure first extracts a time domain modulation signal through a wavelet, converts an incoherent signal into a coherent signal, calculates an accumulation amount at each pixel, and generates a super-resolution image by using a correlation between signals at different spatial positions. An autocorrelation algorithm of dSIM is insensitive to an error of a reconstruction parameter. dSIM bypasses a complex frequency domain operation in SIM image reconstruction and prevents an artifact caused by the parameter error in the frequency domain operation. In addition, dSIM has advantages of SIM imaging, such as a simple sample preparation process, a doubled spatial resolution, a high temporal resolution, live cell imaging, and multicolor imaging. dSIM has high adaptability and can be used in laboratory SIM, non-linear SIM imaging systems, or commercial systems (GE, Nikon, and Zeiss).

BRIEF DESCRIPTION OF THE DRAWINGS

FIG. 1A to FIG. 1C are wide-field (WF) modulation images under structured illumination with different modulation directions, original data is provided by the authors of the cited reference [1]

FIG. 2A is a dSIM result image of all modulation directions of a first modulation frequency K1, FIG. 2B is a dSIM result image of all modulation directions of a second modulation frequency K2, FIG. 2C is a final dSIM result image, FIG. 2D is an RL SIM result image obtained by using a same original image, and FIG. 2E to FIG. 2H are respectively Fourier domain images of FIG. 2A to FIG. 2D;

FIG. 3A shows a SIM result reconstructed through the conventional SIM method, FIG. 3B shows a dSIM result, and FIG. 3C to FIG. 3F are enlarged views of marks in FIG. 3A and FIG. 3B.

DETAILED DESCRIPTION OF THE EMBODIMENTS

The present disclosure is further described below with reference to the specific embodiments and accompanying drawings.

Embodiment 1

Figure 4:
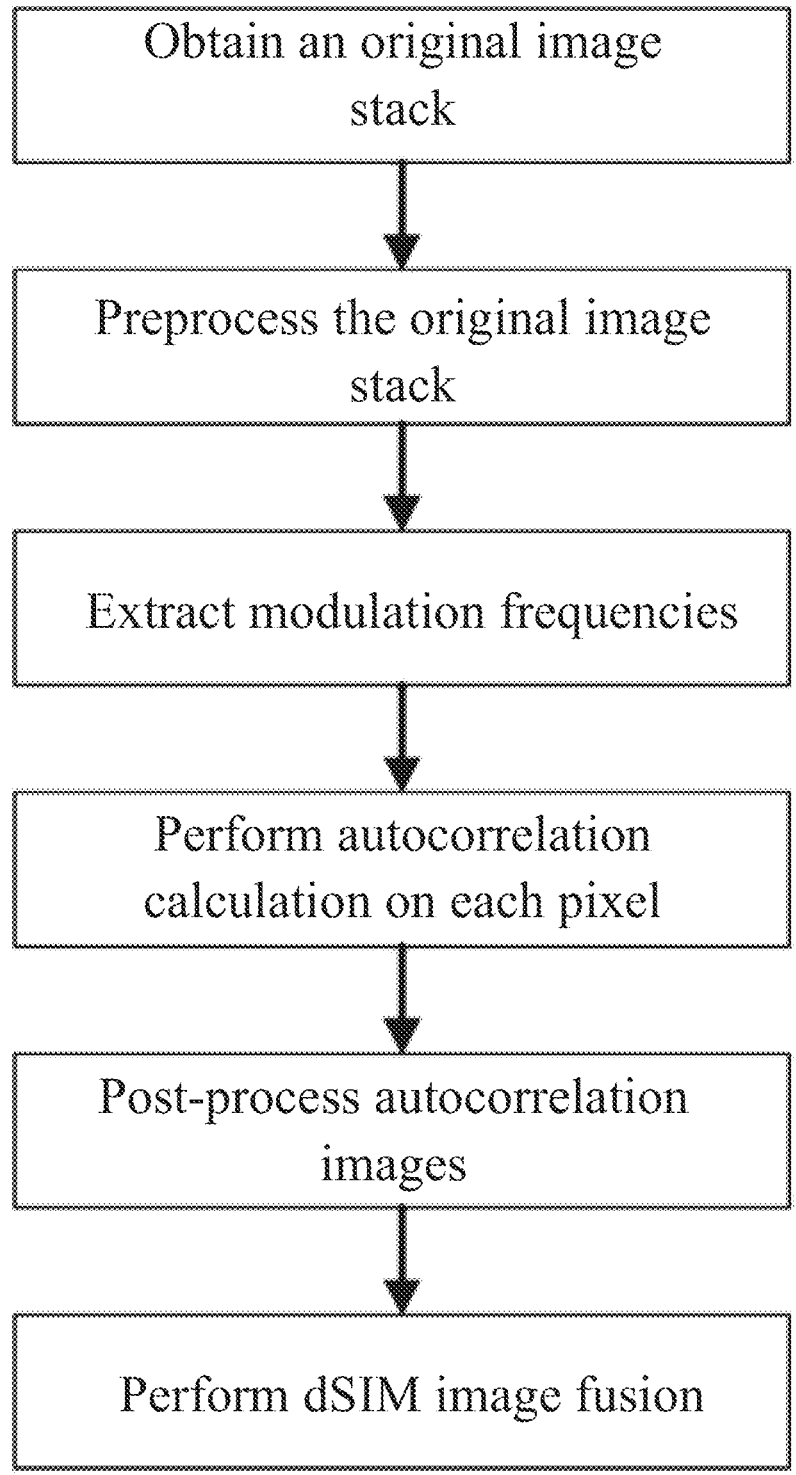
FIG. 4 is a flowchart of a dSIM reconstruction method according to the present disclosure.

In a dSIM reconstruction method in this embodiment of the present disclosure, an original image is a 3D original image. As shown in FIG. 4, the method includes the following steps:

(1) Obtain an original image stack.

Illumination of a sample by structured light has three modulation directions: a first modulation direction, a second modulation direction, and a third modulation direction. Each modulation direction has five phases. One original image is acquired at each phase in each modulation direction such that 15 3D original images are obtained to form the original image stack at two modulation frequencies in space.

(2) Preprocess the original image stack.

(a) Two frequency shifts, namely, shifts of a first modulation frequency K1 and a second modulation frequency K2, are observed from the 3D original images in FIG. 1A to FIG. 1F. The shifts of the two modulation frequencies are in a same direction as fringe modulation. For each 3D original image in the original image stack, extract the first modulation frequency K1, the second modulation frequency K2, and a zero frequency K0 of each pixel by using a wavelet packet frequency separation method.

(b) For each 3D original image, generate a first extracted image by combining the first modulation frequency K1 with the zero frequency K0 to obtain a first extracted image stack, and generate a second extracted image by combining the second modulation frequency K2 with the zero frequency K0 to obtain a second extracted image stack. Two extracted images are generated from one 3D original image. An extracted image stack including the first extracted image stack and the second extracted image is formed. A number of images in the extracted image stack is doubled, namely, 30.

(c) Perform interpolation on each image in the first extracted image stack and the second extracted image stack through spatial frequency domain FFT zero padding to increase a sampling frequency to more than twice and obtain first and second interpolated extracted image stacks.

(d) Denoise extracted images in the first and second interpolated extracted image stacks through Butterworth low-pass filtering to obtain first and second denoised extracted image stacks.

(e) Perform deconvolution on each extracted image in the first and second denoised extracted image stacks through an RL algorithm to improve a relative strength of a high-frequency signal and obtain first and second preprocessed extracted image stacks to form a preprocessed image stack.

(3) Extract the first modulation frequency K1 and the second modulation frequency K2 from the preprocessed image stack.

(a) Extract the first modulation frequency K1 from a timing signal in each pixel of each image in the first preprocessed image stack and extract the second modulation frequency K2 from a timing signal in each pixel of each image in the second preprocessed image stack by using a wavelet packet filter, where a wavelet family is Fejer-Korovkin.

(b) Extract, by using a sigmoid low-pass filter, complex modulation signals from time evolution of the first modulation frequency K1 and the second modulation frequency K2 extracted from each pixel, to convert an incoherent signal into a coherent signal.

(c) Perform FFT interpolation on a complex amplitude signal in the extracted complex modulation signals to increase the sampling frequency to more than twice and obtain a complex modulation image stack.

(4) Perform autocorrelation calculation on each pixel.

This is a first core step of dSIM. For the complex modulation signals extracted from the complex modulation image stack, an autocorrelation accumulation amount is calculated at each pixel. One autocorrelation image is generated for M phases of the first modulation frequency K1 in each modulation direction to obtain N autocorrelation images. The autocorrelation is followed by a real number. Phase information is canceled. One autocorrelation image is generated for the second modulation frequency K2 in each modulation direction to obtain N autocorrelation images. In this way, six autocorrelation images are generated from each 3D original image, as shown in FIG. 1A to FIG. 1F. FIG. 1G to FIG. 1L and FIG. 1M to FIG. 1R are respectively spatial domain and frequency domain images of processing results of the three modulation directions of the first modulation frequency K1 and the second modulation frequency K2. It can be learned that the second modulation frequency K2 has a larger frequency domain range. However, due to limitation of an OTF, a modulation signal strength of the second modulation frequency K2 that is higher is far less than that of the first modulation frequency K1. Consequently, an intensity of the autocorrelation image of the second modulation frequency K2 is lower than that of the first modulation frequency K1.

(5) Post-process the autocorrelation images.

This is a second core step of dSIM. Each autocorrelation image has unidirectional modulation, thereby providing a super-resolution image with unidirectional modulation. When the results of the three directions are added, a resolution isotropically increases. However, direct summation of all directions may greatly reduce the resolution. To maintain a high resolution in a single direction, deconvolution is performed on the result of each direction. RL deconvolution is performed on the autocorrelation images. RL deconvolution is used to enhance high-frequency components within a cut-off frequency. Then, a square root of each pixel value in deconvoluted autocorrelation images is calculated to obtain dSIM intermediate processing results. Calculating the square root can improve linearity of the results, but reduces the resolution of a dSIM image.

(6) Perform dSIM image fusion.

Figure 1A:
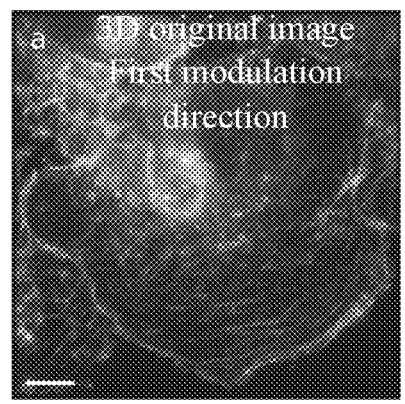
FIG. 1A-R are images of evolution in spatial and frequency domains obtained according to an embodiment of a dSIM reconstruction method in the present disclosure, where
Figure 1B:
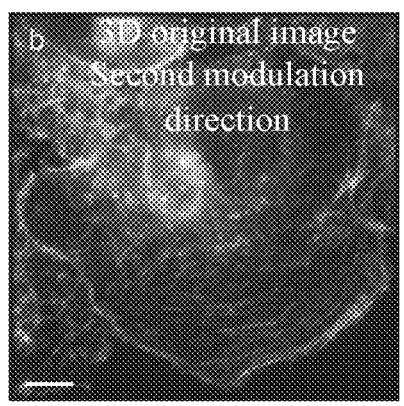
Figure 1C:
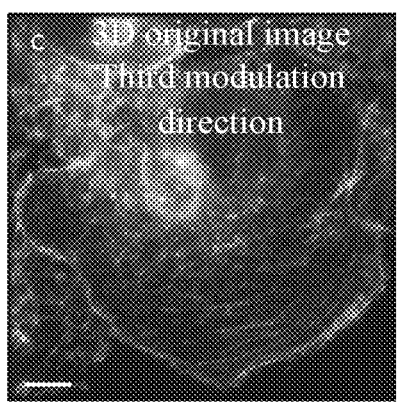
Figure 1D:
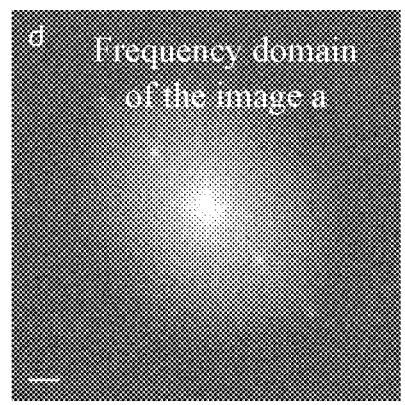
FIG. 1D to FIG. 1F are respectively frequency domain images of FIG. 1A to FIG. 1C, FIG. 1G to FIG. 1I are unidirectional dSIM images of a first modulation frequency K1 in different modulation directions.
Figure 1E:
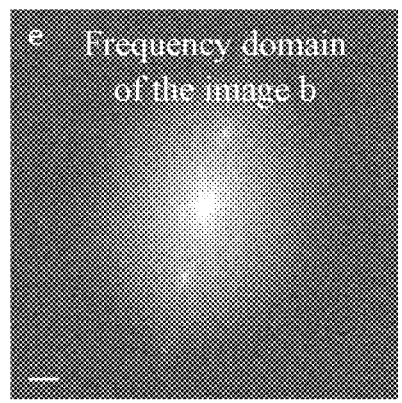
Figure 1F:
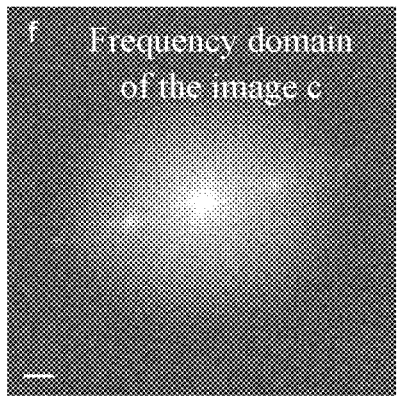
Figure 1G:
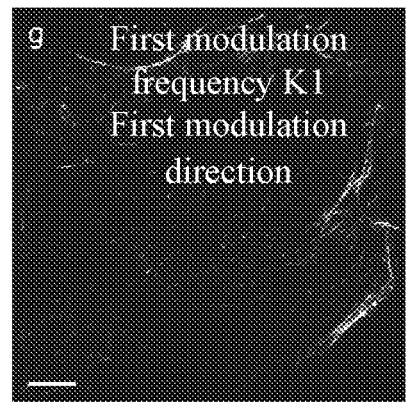
Figure 1H:
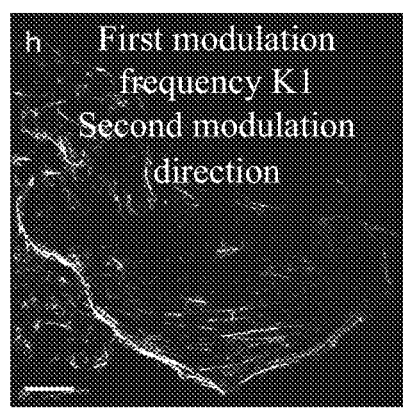
Figure 1I:
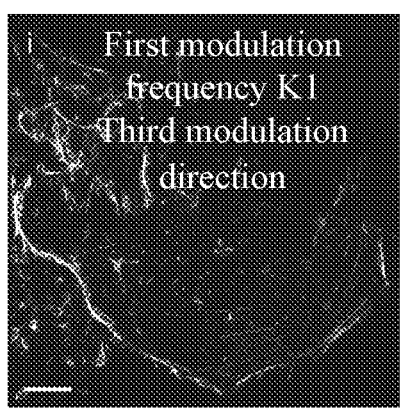
Figure 1J:
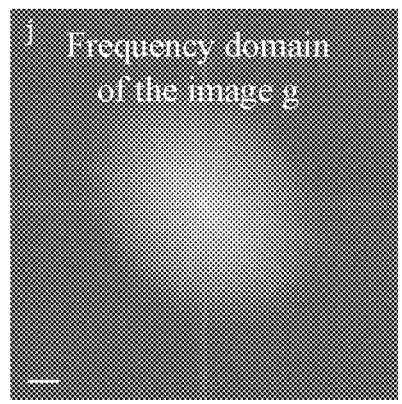
Figure 1K:
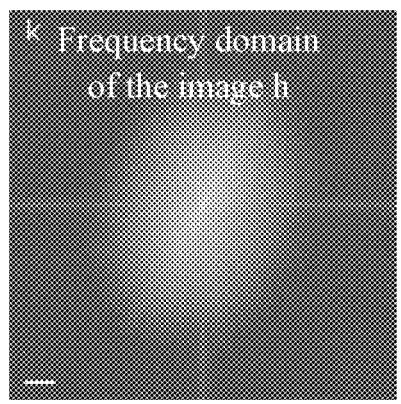
Figure 1L:
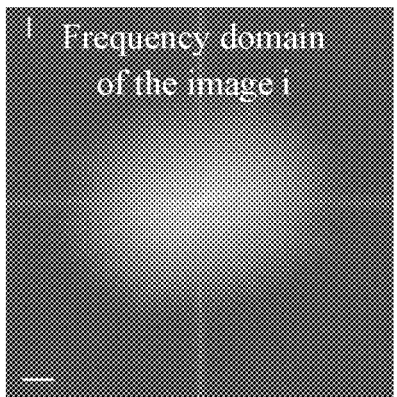
Figure 1M:
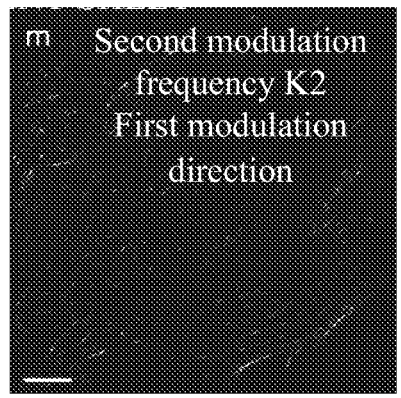
FIG. 1M to FIG. 1O are unidirectional dSIM images of a second modulation frequency K2 in different modulation directions.
Figure 1N:
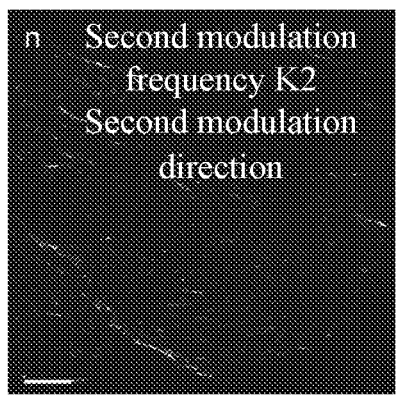
Figure 1O:
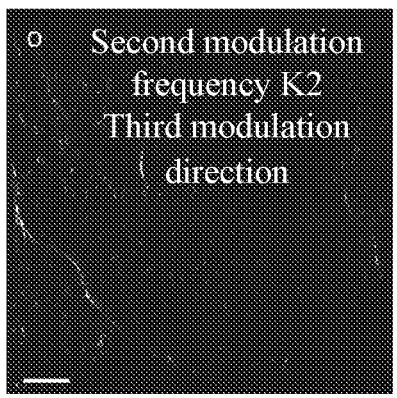
Figure 1P:
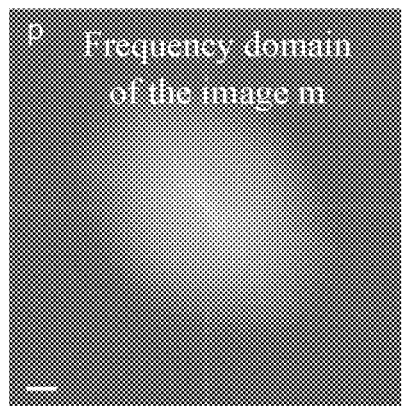
FIG. 1P to FIG. 1Q are respectively frequency domain images of FIG. 1M to FIG. 1O.
Figure 1Q:
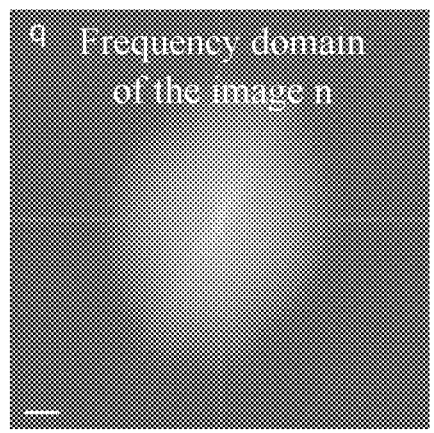
Figure 1R:
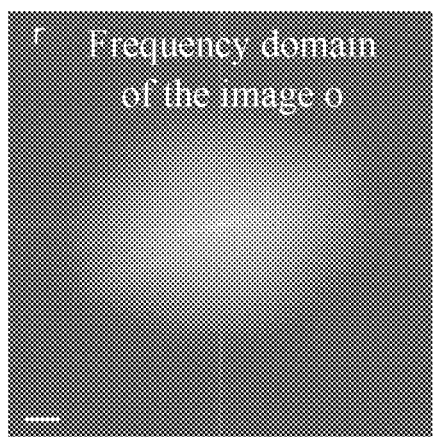
Figure 2A:
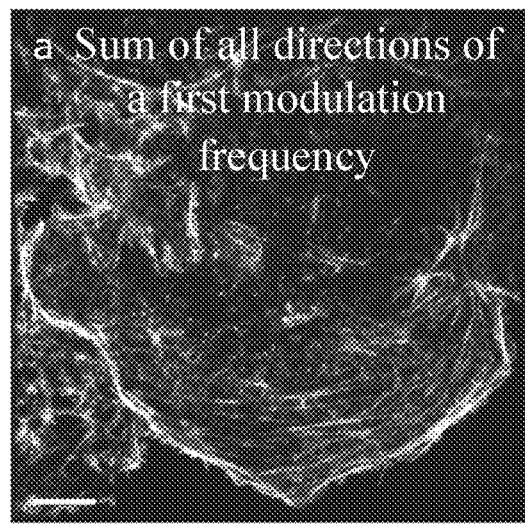
FIG. 2A-H are dSIM result images obtained according to an embodiment of a dSIM reconstruction method in the present disclosure, where
Figure 2B:
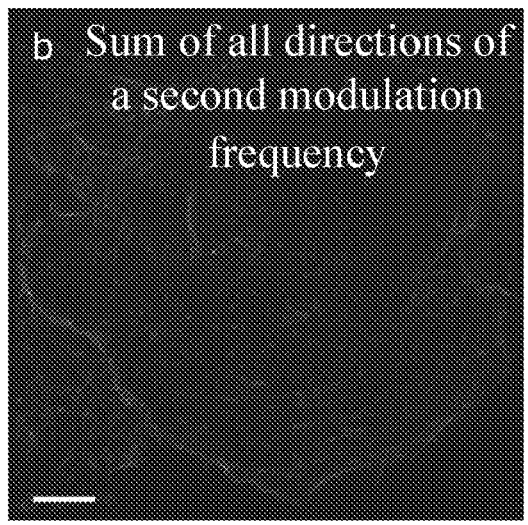
Figure 2C:
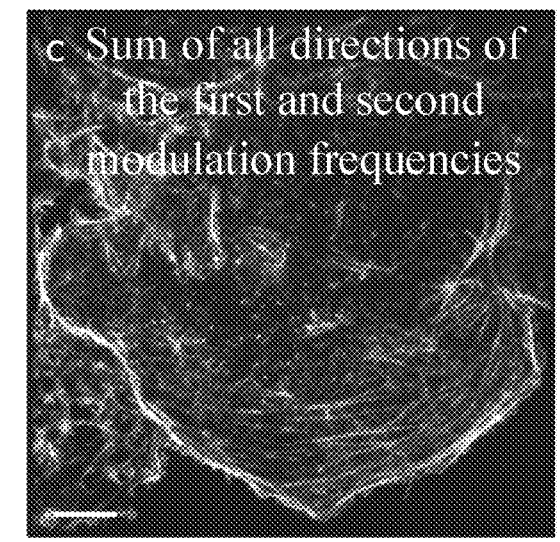
Figure 2D:
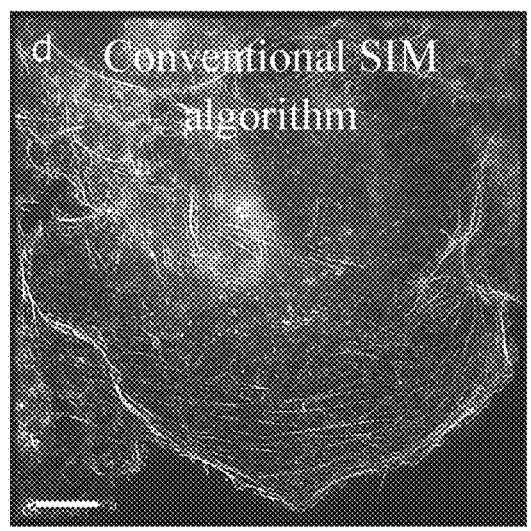
Figure 2E:
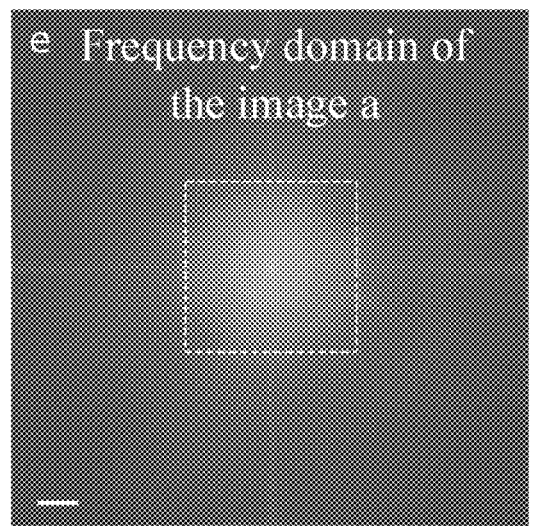
Figure 2F:
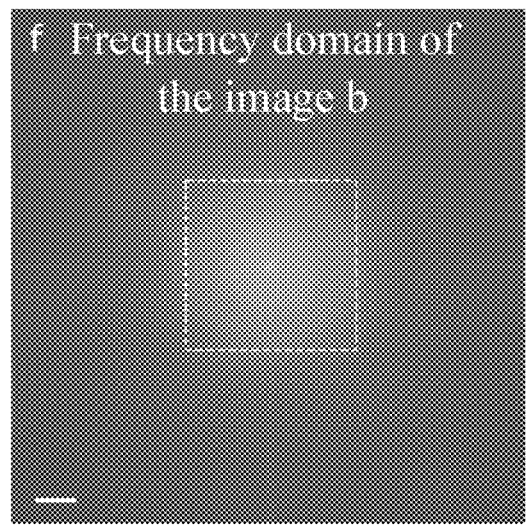

The dSIM intermediate processing results at the first modulation frequency in different modulation directions are added and a result is shown in FIG. 2A. The dSIM intermediate processing results at the second modulation frequency in different modulation directions are added and a result is shown in FIG. 2B. In FIG. 2E and FIG. 2F, cut-off frequencies of summation results of the first and second modulation frequencies K1 and K2 are almost isotropic in comparison with the unidirectional processing result in FIG. 1A-R. Finally, a final dSIM result, namely, a summation result of FIG. 2A and FIG. 2B, is obtained by adding all directional results of the first and second modulation frequencies K1 and K2, as shown in FIG. 2C.

Figure 2G:
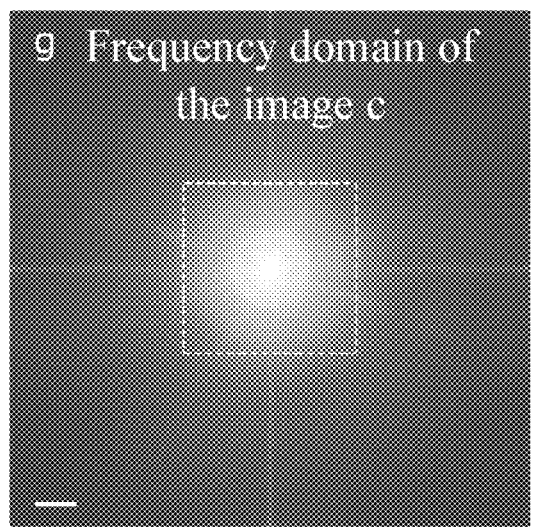
Figure 2H:
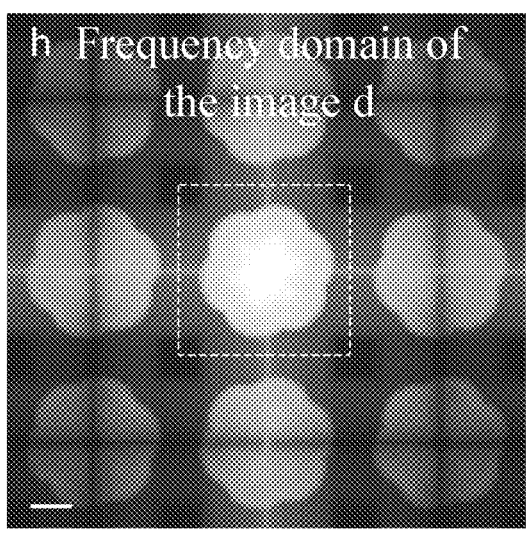

In FIG. 2G, unlike a frequency domain of the conventional SIM, the frequency domain of the dSIM is smoother, in which there is hardly a peak caused by the frequency shift. Therefore, the dSIM hardly generates a cellular artifact in the conventional SIM. For convenience of comparison, the frequency domain of the conventional SIM is interpolated to make the frequency domain range and pixel size consistent with those of the dSIM. The white dotted box in the figure is the frequency range of the SIM reconstruction result. It can be learned from FIG. 2G and FIG. 2H, the cut-off frequency of the dSIM is slightly higher than a frequency boundary of the SIM.

Figure 3A:
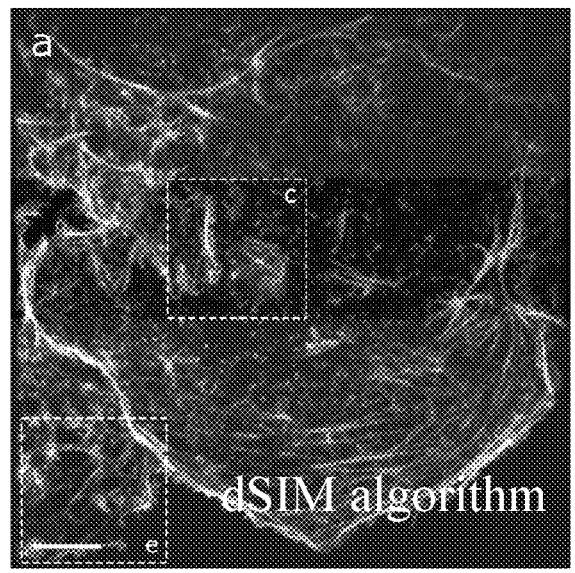
FIG. 3A-F show actin results obtained through a dSIM reconstruction method according to the present disclosure and a conventional SIM method, where
Figure 3B:
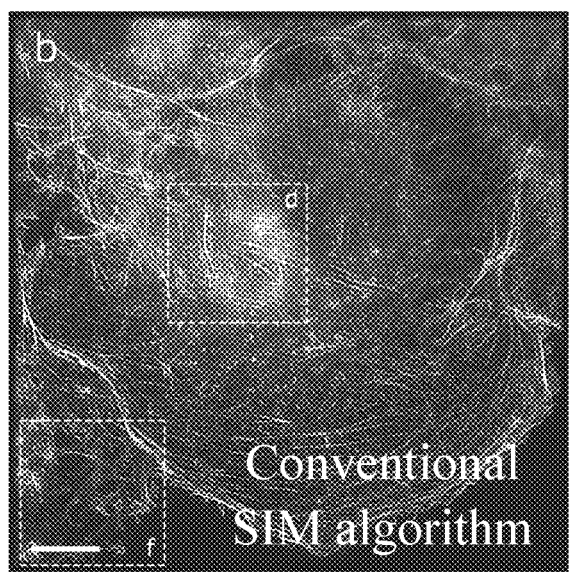
Figure 3C:
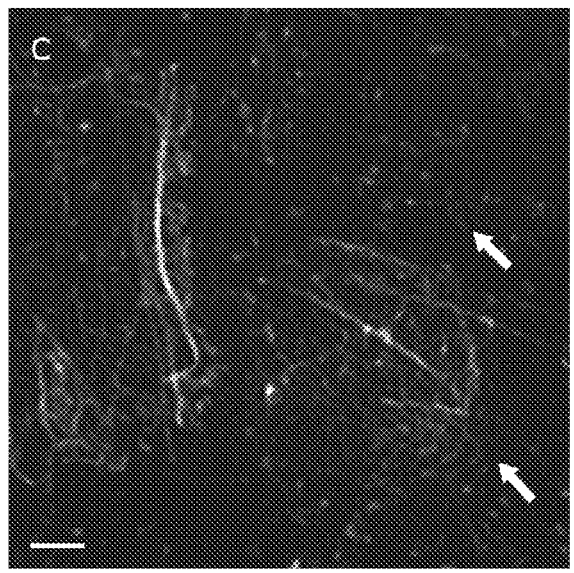
Figure 3D:
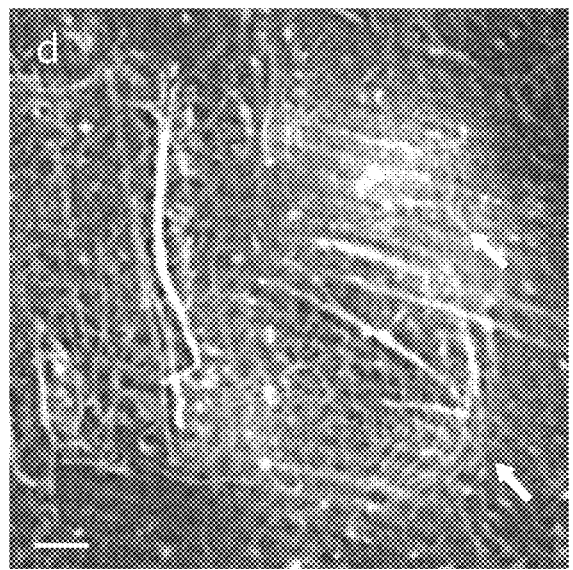
Figure 3E:
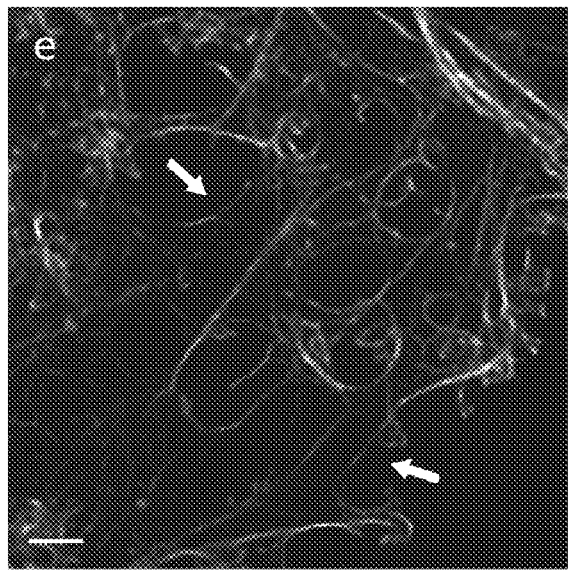
Figure 3F:
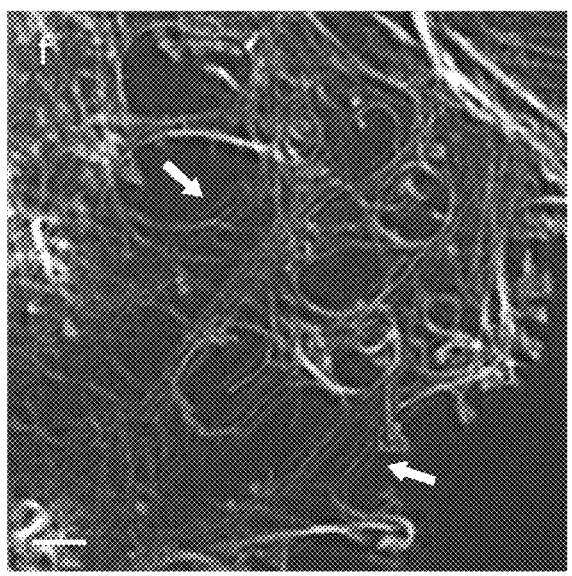

In FIG. 3A-F, more details of experimental imaging of actin through the SIM and dSIM are provided and the results are compared in terms of defocus background cancellation and Moire artifacts. It can be learned from comparison between FIG. 3C and FIG. 3D that in a conventional SIM algorithm, as shown in FIG. 3D, obvious defocus artifacts appear, which are represented as strong stripe artifacts in three directions as shown by arrows. This is because the conventional SIM algorithm cannot eliminate impact of a defocus signal, and the defocus is shifted to a high frequency during the frequency shift, resulting in the stripe defocus artifacts. In the processing result of the dSIM method, there is no defocus artifact, and microfilament protein on a focal plane can be clearly seen. It can be learned from FIG. 3F that due to a change in parameters such as a local modulation depth, ripple artifacts appear around normal microfilament protein, as shown by the arrows. The artifacts affect judgment of a real structure of the sample. In FIG. 3E, there is no obvious Moire artifact. This indicates that the dSIM method is insensitive to the change in the parameters such as the modulation depth, and is not prone to artifacts caused by a parameter estimation error of the conventional algorithm.

Embodiment 2

In a dSIM reconstruction method in this embodiment, an original image is a 2D original image. The method includes the following steps:

(1) Obtain an original image stack.

Illumination of a sample by structured light has three modulation directions. Each modulation direction has three phases. One original image is acquired at each phase in each modulation direction such that nine 2D original images are obtained to form the original image stack.

(2) Preprocess the original image stack.

(a) Perform interpolation on each 2D original image in the original image stack through spatial frequency domain FFT zero padding to increase a sampling frequency to more than twice and obtain an interpolated extracted image stack.

(b) Denoise extracted images in the interpolated extracted image stack to obtain a denoised extracted image stack.

(c) Perform deconvolution on each extracted image in the denoised extracted image stack through an RL algorithm to improve a relative strength of a high-frequency signal and obtain a preprocessed image stack.

(3) Extract a modulation frequency K from the preprocessed image stack.

(a) Extract the modulation frequency K from a timing signal in each pixel of each image in the preprocessed image stack by using a wavelet packet filter.

(b) Extract, by using a sigmoid low-pass filter, complex modulation signals from time evolution of the modulation frequency K extracted from each pixel, to convert an incoherent signal into a coherent signal.

(c) Perform FFT interpolation on a complex amplitude signal in the extracted complex modulation signals to increase the sampling frequency to more than twice and obtain a complex modulation image stack.

(4) Perform autocorrelation calculation on each pixel.

For the complex modulation signals extracted from the complex modulation image stack, calculate an autocorrelation accumulation amount at each pixel, generate one autocorrelation image for three phases in each modulation direction to obtain three autocorrelation images, and generate a super-resolution image by using a correlation between signals at different spatial positions.

(5) Post-process the autocorrelation images.

Perform RL deconvolution on the autocorrelation images, and calculate a square root of each pixel value in deconvoluted autocorrelation images to obtain dSIM intermediate processing results. Calculating the square root can improve linearity of the result, but reduces the resolution of a dSIM image.

(6) Perform dSIM image fusion.

Add the dSIM intermediate processing results at the modulation frequency in different modulation directions to generate a final dSIM image.

Finally, it should be noted that disclosure of the embodiments is intended to help further understand the present disclosure. Those skilled in the art can understand that various substitutions and modifications may be made without departing from the spirit and scope of the present disclosure and the appended claims. Therefore, the present disclosure should not be limited to the content disclosed in the embodiments, and the scope of protection claimed by the present disclosure is subject to the scope defined by the claims.

CITED REFERENCE

[1] Muller, M., et al., Open-source image reconstruction of super-resolution structured illumination microscopy data in ImageJ. Nature Communications, 2016.7:p. 10980.

What is claimed is:

1. A direct structured illumination microscopy (dSIM) reconstruction method, wherein an original image is a three-dimensional (3D) original image, and the dSIM reconstruction method comprises the following steps:

(1) obtaining an original image stack, wherein illumination of a sample by structured light has N modulation directions, each modulation direction has M phases, N and M are natural numbers greater than or equal to 2, and one original image is acquired at each phase in each modulation direction such that N×M 3D original images are obtained to form the original image stack;

(2) preprocessing the original image stack, which specifically comprises:

(a) for each 3D original image in the original image stack, extracting a first modulation frequency K1, a second modulation frequency K2, and a zero frequency K0 of each pixel by using a wavelet packet frequency separation method;

(b) for each 3D original image, generating a first extracted image by combining the first modulation frequency K1 with the zero frequency K0 to obtain a first extracted image stack, and generating a second extracted image by combining the second modulation frequency K2 with the zero frequency K0 to obtain a second extracted image stack, wherein two extracted images are generated from one 3D original image, an extracted image stack comprising the first extracted image stack and the second extracted image is formed, and a number of images in the extracted image stack is doubled, namely, 2N×M;

(c) performing interpolation on each image in the first extracted image stack and the second extracted image stack through spatial frequency domain fast Fourier transform (FFT) zero padding to increase a sampling frequency to more than twice and obtain first and second interpolated extracted image stacks;

(d) denoising extracted images in the first and second interpolated extracted image stacks to obtain first and second denoised extracted image stacks; and (e) performing deconvolution on each denoised extracted image in the first and second denoised extracted image stacks through a Richardson-Lucy (RL) algorithm to improve a relative strength of a high-frequency signal and obtain first and second preprocessed extracted image stacks to form a preprocessed image stack with 2N×M images;

(3) extracting the first modulation frequency K1 and the second modulation frequency K2 from the preprocessed image stack, which specifically comprises:

(a) extracting the first modulation frequency K1 from a timing signal in each pixel of each image in the first preprocessed image stack and extracting the second modulation frequency K2 from a timing signal in each pixel of each image in the second preprocessed image stack by using a wavelet packet filter;

(b) extracting, by using a low-pass filter, complex modulation signals from time evolution of the first modulation frequency K1 and the second modulation frequency K2 extracted from each pixel, to convert an incoherent real signal of the 3D original image into a coherent complex modulation signal; and (c) performing FFT interpolation on the extracted complex modulation signals to increase the sampling frequency to more than twice and obtain a complex modulation image stack;

(4) performing autocorrelation calculation on each pixel, which specifically comprises:

calculating an autocorrelation accumulation amount of the complex modulation signal at each pixel of the extracted complex modulation image stack, generating one autocorrelation image for M phases of the first modulation frequency K1 in each modulation direction to obtain N autocorrelation images, and generating one autocorrelation image for the second modulation frequency K2 in each modulation direction to obtain N autocorrelation images, to generate super-resolution images by using autocorrelation accumulation amounts of signals at different spatial positions, wherein 2N images are generated from each original image stack;

(5) post-processing the autocorrelation images, which specifically comprises:

performing RL deconvolution on the autocorrelation images; and calculating a square root of each pixel value in the deconvoluted autocorrelation images to obtain dSIM intermediate processing results; and (6) performing dSIM image fusion, which specifically comprises:

adding the dSIM intermediate processing results at the first modulation frequency and the second modulation frequency in different modulation directions to generate a final dSIM image.

2. The dSIM reconstruction method according to claim 1, wherein the denoising in substep (d) of step (2) comprises: performing Butterworth low-pass filtering on spatial and frequency domain images.

3. The dSIM reconstruction method according to claim 1, wherein extracting the complex modulation signals from the time evolution of the first modulation frequency K1 and the second modulation frequency K2 in substep (b) of step (3) comprises: extracting a real signal of the modulation frequency by using a wavelet packet, and extracting the complex modulation signal by using the filter.

4. The dSIM reconstruction method according to claim 1, wherein calculating the autocorrelation accumulation amount at each pixel and generating the autocorrelation image for the M phases of each modulation frequency in step (4) comprises: calculating the autocorrelation accumulation amount of the complex modulation signal at each pixel in the complex modulation image stack of the M phases in the same modulation direction, and generating a result image to obtain the autocorrelation image.

5. A direct structured illumination microscopy (dSIM) reconstruction method, wherein an original image is a two-dimensional (2D) original image or a total internal reflection fluorescence (TIRF) microscopy image, and the dSIM reconstruction method comprises the following steps:

(1) obtaining an original image stack, wherein
illumination of a sample by structured light has N modulation directions, each modulation direction has M phases, N and M are natural numbers greater than or equal to 2, and one original image is acquired at each phase in each modulation direction such that N×M 2D original images or TIRF microscopy images are obtained to form the original image stack;

(2) preprocessing the original image stack, which specifically comprises:
(a) performing interpolation on each 2D original image or TIRF microscopy image in the original image stack through spatial frequency domain fast Fourier transform (FFT) zero padding to increase a sampling frequency to more than twice and obtain an interpolated extracted image stack;
(b) denoising extracted images in the interpolated extracted image stack to obtain a denoised extracted image stack; and
(c) performing deconvolution on each denoised extracted image in the denoised extracted image stack through a Richardson-Lucy (RL) algorithm to improve a relative strength of a high-frequency signal and obtain N×M preprocessed images to form a preprocessed image stack;

(3) extracting a modulation frequency K from the preprocessed image stack, which specifically comprises:
(a) extracting the modulation frequency K from a timing signal in each pixel of each image in the preprocessed image stack by using a wavelet packet filter;
(b) extracting, by using a low-pass filter, complex modulation signals from time evolution of the modulation frequency K extracted from each pixel, to convert an incoherent real signal of the 2D original image or the TIRF microscopy image into a coherent complex modulation signal; and
(c) performing FFT interpolation on a complex amplitude signal in the extracted complex modulation signal to increase the sampling frequency to more than twice and obtain a complex modulation image stack;

(4) performing autocorrelation calculation on each pixel, which specifically comprises:
for the complex modulation signals extracted from the complex modulation image stack, calculating an autocorrelation accumulation amount at each pixel, and generating one autocorrelation image for the M phases in each modulation direction to obtain N autocorrelation images, wherein the autocorrelation images are super-resolution images, to generate super-resolution images by using autocorrelation accumulation amounts of signals at different spatial positions;

(5) post-processing the autocorrelation images, which specifically comprises:
performing RL deconvolution on the autocorrelation images, and calculating a square root of each pixel value in deconvoluted autocorrelation images to obtain dSIM intermediate processing results; and (6) performing dSIM image fusion, which specifically comprises:
adding the dSIM intermediate processing results in different modulation directions to generate a final dSIM image.

6. The dSIM reconstruction method according to claim 5, wherein the denoising in substep (d) of step (2) comprises: performing Butterworth low-pass filtering on spatial and frequency domain images.

7. The dSIM reconstruction method according to claim 5, wherein extracting the complex modulation signals from the time evolution of the modulation frequency K extracted from each pixel comprises: extracting a real signal of the modulation frequency by using a wavelet packet, and extracting the complex modulation signal by using the filter.

8. The dSIM reconstruction method according to claim 5, wherein calculating the autocorrelation accumulation amount at each pixel and generating the autocorrelation image for the M phases in each modulation direction in step (4) comprises: calculating the autocorrelation accumulation amount of the complex modulation signal at each pixel in the complex modulation image stack of the M phases in the same modulation direction, and generating a result image to obtain the autocorrelation image.

* * * * *